(12) United States Patent
Gunther

(10) Patent No.: US 9,479,650 B1
(45) Date of Patent: Oct. 25, 2016

(54) METHODS AND DEVICES FOR UPDATING FILTER COEFFICIENTS DURING ECHO CANCELLATION

(71) Applicant: CaptionCall, LLC, Salt Lake City, UT (US)

(72) Inventor: Jacob H. Gunther, North Logan, UT (US)

(73) Assignee: CaptionCall, LLC, Salt Lake City, UT (US)

( * ) Notice: Subject to any disclaimer, the term of this patent is extended or adjusted under 35 U.S.C. 154(b) by 0 days.

(21) Appl. No.: 14/933,954

(22) Filed: Nov. 5, 2015

Related U.S. Application Data

(60) Provisional application No. 62/156,801, filed on May 4, 2015.

(51) Int. Cl.
*H04M 9/08* (2006.01)
*H04B 3/23* (2006.01)
*G10K 11/16* (2006.01)

(52) U.S. Cl.
CPC .............. *H04M 9/082* (2013.01); *G10K 11/16* (2013.01); *H04B 3/237* (2013.01)

(58) Field of Classification Search
CPC .............................. H04B 3/237; H04M 9/082
See application file for complete search history.

(56) References Cited

U.S. PATENT DOCUMENTS

| | | | |
|---|---|---|---|
| 5,305,307 A | 4/1994 | Chu | |
| 5,365,583 A | 11/1994 | Huang et al. | |
| 5,535,194 A | 7/1996 | Ashley et al. | |
| 5,577,097 A | 11/1996 | Meek | |
| 5,663,955 A | 9/1997 | Lyengar | |
| 5,664,011 A | 9/1997 | Crochiere et al. | |
| 5,909,482 A | 6/1999 | Engelke | |
| 5,974,116 A | 10/1999 | Engelke et al. | |
| 5,978,654 A | 11/1999 | Colwell et al. | |
| 6,028,929 A | 2/2000 | Laberteaux | |
| 6,031,908 A | 2/2000 | Laberteaux et al. | |

(Continued)

FOREIGN PATENT DOCUMENTS

EP          0872962 A2       10/1998

OTHER PUBLICATIONS

Gansler et al. "The fast normalized crosscorrelation double-talk detector," Signal Processing, vol. 86, pp. 1124-1139, 2006.

(Continued)

*Primary Examiner* — Lisa Hashem
(74) *Attorney, Agent, or Firm* — TraskBritt

(57) ABSTRACT

Methods and devices for updating filter coefficients during echo cancellation are disclosed. A communication device includes a processor configured to operate a background filter configured as an adaptive filter, operate a foreground filter configured as a fixed filter; and update the foreground filter with coefficients from the background filter responsive to monitoring a history of both a near-end signal energy and an estimated far-end signal energy for a pre-determined time window in which conditions of each of the near-end signal energy and the estimated far-end signal energy are satisfied. A related method includes monitoring a near-end signal energy, monitoring an estimated far-end signal energy, performing an echo cancellation, and transferring coefficients from an adaptive filter to a fixed filter responsive to a history of both the near-end signal energy and the estimated far-end signal energy satisfying conditions for a pre-determined time window.

21 Claims, 5 Drawing Sheets

(56) References Cited

U.S. PATENT DOCUMENTS

| | | | |
|---|---|---|---|
| 6,075,841 A | 6/2000 | Engelke et al. | |
| 6,075,842 A | 6/2000 | Engelke et al. | |
| 6,181,793 B1 | 1/2001 | Laberteaux et al. | |
| 6,219,418 B1* | 4/2001 | Eriksson | H04B 3/237 379/406.08 |
| 6,233,314 B1 | 5/2001 | Engelke | |
| 6,307,921 B1 | 10/2001 | Engelke et al. | |
| 6,434,110 B1 | 8/2002 | Hemkumar | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,549,611 B2 | 4/2003 | Engelke et al. | |
| 6,567,503 B2 | 5/2003 | Engelke et al. | |
| 6,594,346 B2 | 7/2003 | Engelke | |
| 6,603,835 B2 | 8/2003 | Engelke et al. | |
| 6,748,053 B2 | 6/2004 | Engelke et al. | |
| 6,882,707 B2 | 4/2005 | Engelke et al. | |
| 6,885,731 B2 | 4/2005 | Engelke et al. | |
| 6,934,366 B2 | 8/2005 | Engelke et al. | |
| 7,003,082 B2 | 2/2006 | Engelke et al. | |
| 7,006,604 B2 | 2/2006 | Engelke | |
| 7,164,753 B2 | 1/2007 | Engelke et al. | |
| 7,319,740 B2 | 1/2008 | Engelke et al. | |
| 7,408,891 B2 | 8/2008 | Popovic et al. | |
| 7,555,104 B2 | 6/2009 | Engelke | |
| 7,660,398 B2 | 2/2010 | Engelke et al. | |
| 7,881,441 B2 | 2/2011 | Engelke et al. | |
| 8,213,578 B2 | 7/2012 | Engleke et al. | |
| 8,254,588 B2 | 8/2012 | Karthik et al. | |
| 8,295,475 B2 | 10/2012 | Li et al. | |
| 8,369,512 B2 | 2/2013 | Le Tourneur | |
| 8,379,801 B2 | 2/2013 | Romriell et al. | |
| 8,411,847 B2 | 4/2013 | Burns et al. | |
| 8,416,925 B2 | 4/2013 | Engelke et al. | |
| 8,571,244 B2* | 10/2013 | Salvetti | H04R 3/02 381/317 |
| 8,681,999 B2* | 3/2014 | Theverapperuma | H04R 25/453 381/312 |
| 8,908,838 B2 | 12/2014 | Engelke et al. | |
| 8,917,821 B2 | 12/2014 | Engelke et al. | |
| 8,917,822 B2 | 12/2014 | Engelke et al. | |
| 8,942,398 B2* | 1/2015 | Salvetti | H04R 25/453 381/318 |
| 9,112,951 B2* | 8/2015 | Mani | H04M 3/002 |
| 2002/0085685 A1 | 7/2002 | Engelke et al. | |
| 2003/0053617 A1* | 3/2003 | Diethorn | H04M 9/082 379/406.01 |
| 2004/0052358 A1* | 3/2004 | Lashley | H04B 3/23 379/387.01 |
| 2004/0057586 A1* | 3/2004 | Licht | H03G 3/32 381/94.7 |
| 2005/0058277 A1 | 3/2005 | Barron et al. | |
| 2005/0122893 A1* | 6/2005 | Guduru | H04B 3/32 370/201 |
| 2005/0286714 A1 | 12/2005 | Tokuda | |
| 2006/0233353 A1 | 10/2006 | Beaucoup et al. | |
| 2007/0286404 A1* | 12/2007 | Popovic | H04B 3/237 379/406.01 |
| 2008/0187108 A1 | 8/2008 | Engelke et al. | |
| 2009/0028355 A1 | 1/2009 | Ishiguro | |
| 2009/0168673 A1* | 7/2009 | Kalampoukas | H04L 65/601 370/286 |
| 2009/0287496 A1* | 11/2009 | Thyssen | H03G 7/007 704/500 |
| 2010/0232632 A1* | 9/2010 | Kindred | H04M 1/72591 381/315 |
| 2011/0019833 A1* | 1/2011 | Kuech | H04M 9/082 381/66 |
| 2011/0170672 A1 | 7/2011 | Engelke et al. | |
| 2012/0250837 A1 | 10/2012 | Engleke et al. | |
| 2014/0192993 A1* | 7/2014 | Mikami | H04R 3/02 381/71.4 |
| 2015/0163346 A1* | 6/2015 | Adams | H04M 3/002 379/406.08 |

OTHER PUBLICATIONS

Gunther et al. "Stopping and restarting adaptive updates to recursive least-squares lattice adaptive filtering algorithms," in Adaptive and learning Systems, 2006 IEEE Mountain Workshop on,Jul. 2006, pp. 1-6.

Haneda et al. "Implementation and evaluation of an acoustic echo canceller using duo-filter control system," in Proc. European Signal Processing Conference (EUSIPCO), 1996. 4 pages.

IEEE, "IEEE standard methods for measuring transmission performance of analog and digital telephone sets, handsets, and headsets—redline," IEEE Std 269-2010 (Revision of IEEE Std 269-2002)—Redline, pp. 1-173, Aug. 2010. pages.

Iqbal et al., "Novel and efficient download test for two path echo canceller," in Applications of Signal Processing to Audio and Acoustics, 2007 IEEE Workshop on, Oct. 2007, pp. 167-170.

Lindstrom et al, "An improvement of the two-path algorithm transfer logic for acoustic echo cancellation," Audio, Speech, and Language Processing, IEEE Transactions on, vol. 15, No. 4, pp. 1320-1326, May 2007.

Liu et al. "An improved transfer logic of the two-path algorithm for acoustic echo cancellation," World Academy of Science, Engineering and Technology, vol. 51, 2011., 5 pages.

Ochiai et al. "Echo canceler with two echo path models," Communications, IEEE Transactions on, vol. 25, No. 6, pp. 589-595, Jun. 1977.

Schuldt et al., "An improved deviation measure for two-path echo cancellation," in Acoustics Speech and Signal Processing (ICASSP), 2010 IEEE International Conference on, Mar. 2010, pp. 305-308.

Schuldt et al, "Evaluation of an improved deviation measure for two-path echo cancellation," in 12th International Workshop on Acoustic Echo and Noise control (IWAENC), 2010, 4 pages.

* cited by examiner

METHODS AND DEVICES FOR UPDATING FILTER COEFFICIENTS DURING ECHO CANCELLATION

CROSS-REFERENCE TO RELATED APPLICATION

This application claims the benefit of U.S. Provisional Patent Application Ser. No. 62/156,801, filed May 4, 2015, the disclosure of which is hereby incorporated herein in its entirety by this reference.

FIELD

Embodiments of the disclosure relate to echo cancellation in communication devices. More particularly, the disclosure relates to updating an adaptive filter for echo cancellation in communication devices.

BACKGROUND

Communication systems, such as conventional telephone communication systems, provide audio communication between two or more users during a communication session. Each user may communicate with each other using a communication device having a speaker and a microphone. During a communication session, the communication device may experience echo (e.g., hybrid echo, acoustic echo, etc.).

The term "hybrid echo" (also referred to as "electric echo") describes a phenomenon in which a fraction of the signal leaving the phone is reflected by a hybrid circuit and returns into the phone. This is particularly prevalent in voice-band communication circuits where there are impedance imbalances in local two-wire to four-wire hybrid circuits. The effect of hybrid echo is that the near-end user hears their own utterances repeated back to them. The echo delay of hybrid echo is often short enough that it is not perceived on analog phone handsets; however, hybrid echo can be more of a problem in speaker phone systems.

The term "acoustic echo" describes the phenomenon in which a local audio loop occurs when a microphone picks up audio signals from a speaker. Within a communication device, a speaker enables local reproduction of audio signals from the far end, and the microphone measures sounds produced at the near end. In this setting, acoustic echo occurs through mechanical and acoustic coupling (reverberation in the room or enclosure) between the speaker and microphone. The effect of acoustic echo is that the person at the far end hears a delayed version of their own utterances. Acoustic echo may be intensified by the speaker volume turned up to a high level and/or when the microphone and speaker are close together.

Beside the perceived unnaturalness of hybrid echo and acoustic echo, echo is actually a manifestation of a positive feedback in the communication system. Under suitable conditions, which are not under user control and which are random in nature, the communication system may become unstable. Echo cancellation systems may be employed within communication devices to cancel hybrid echo and/or acoustic echo.

A conventional echo canceler uses adaptive filtering algorithms to update its impulse response $w(i)$ over time as new samples of the audio signals to and from the far-end become available. When the incoming far-end signal is inactive and the near end signal is active, then minimization of the variance of echo canceled signal $e(i)$ leads to the matching condition of the impulse response $w(i)$ and the echo path $h(i)$. In other words, $w(i)=h(i)$. Effectively, the adaptive filter has learned the impulse response of the physical echo path through the hybrid circuit. When both far-end and near-end signals are simultaneously active (i.e., a condition referred to as double talk) then the far-end signal acts as interference, the impulse response $w(i)$ diverges from the echo path $h(i)$, and residual echo becomes audible.

To prevent this divergence and maintain a lock on the matching condition, conventional echo cancelers employ double-talk detection strategies to control (start, stop and restart) adaptive updates. The main drawbacks of the conventional approach are twofold. First, double-talk detection may be an error prone process and inevitable missed detections of double talk lead to filter divergence and residual echo. Second, if the echo path $h(i)$ changes while adaptation is halted, then the impulse response $w(i)$ may not satisfy the matching condition and residual echo may occur.

BRIEF SUMMARY

In some embodiments, the disclosure comprises a communication device. The communication device comprises a microphone configured to capture a near-end signal, a speaker configured to produce sound from a far-end signal, and a processor. The processor is configured to operate a background filter configured as an adaptive filter, operate a foreground filter configured as a fixed filter; and update the foreground filter with coefficients from the background filter responsive to monitoring a history of both a near-end signal energy and an estimated far-end signal energy for a pre-determined time window in which conditions of each of the near-end signal energy and the estimated far-end signal energy are satisfied.

A method is described for cancelling echo in a communication device during a communication session with a far-end device. The method comprises monitoring a near-end signal energy, monitoring an estimated far-end signal energy, performing an echo cancellation on an input signal that includes echo that is input to an echo canceller, and transferring coefficients from an adaptive background filter to a fixed foreground filter responsive to a recent history of both the near-end signal energy and the estimated far-end signal energy satisfying conditions for a pre-determined time window.

A non-transitory computer-readable medium is described that, when executed by a processor, is configured to operate an echo cancellation module, comprising an adaptive background filter configured to generate an adaptive echo canceled output from a line-in signal and a line-out signal, and a fixed foreground filter configured to generate an echo canceled signal from the line-in signal and the line-out signal. The coefficients for the fixed foreground filter are updated with coefficients from the adaptive background filter responsive to satisfying conditions indicating that a near-end signal is generally active and a far-end signal is generally inactive over a recent history of both the near-end signal energy and the estimated far-end signal energy during a pre-determined time window.

DETAILED DESCRIPTION

Figure 1:
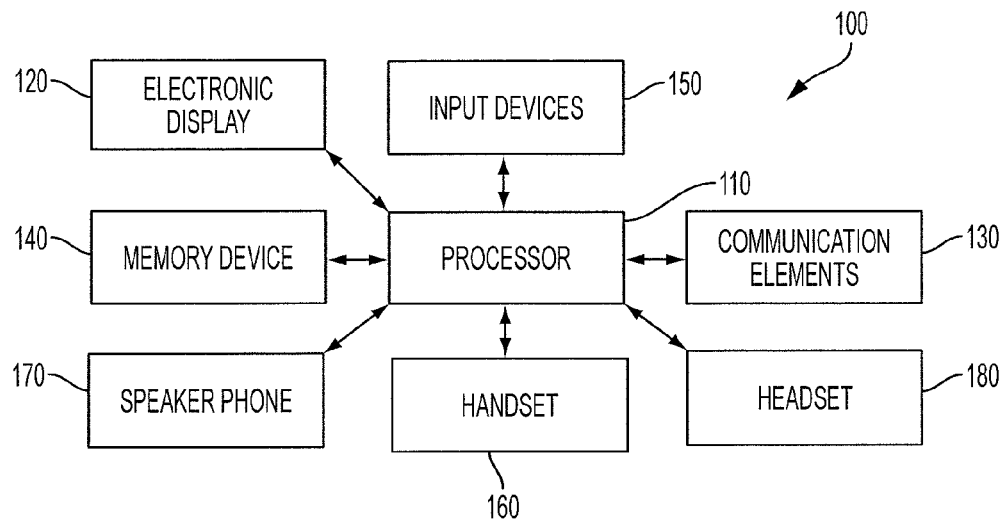
FIG. 1 is a simplified schematic block diagram of a communication device for use by a hearing-impaired user according to an embodiment of the disclosure.

In the following detailed description, reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications. Embodiments include features that improve the functionality of the communication device such that new communication device and improved method for performing echo cancellation are described, particularly in a telecommunication system including a relay service for providing text captions to a caption-enabled communication device to assist hearing-impaired users who may use speakers that operate at relatively high volume levels for the hearing-impaired users.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a "hearing-impaired user" may refer to a person with diminished hearing capabilities. Hearing-impaired users of caption-enabled communication device often have some level of hearing ability that has usually diminished over a period of time such that they can communicate by speaking, but that they often struggle in hearing and/or understanding the far-end user.

The term "call" as used herein refers to the communication session between the hearing-impaired user's communication device and the far-end user's communication device. The call may pass audio signals between the two parties. The term call is used in order to be more easily distinguishable from the captioning communication session. At times, the call may be referred to as incoming or outgoing from the perspective of the hearing-impaired user's communication device. Incoming and outgoing calls may refer to the period of time prior to when the call is "answered" by the other party to begin the communication of the audio signals therebetween.

The term "captioning communication session" as used herein refers to the communication session between the hearing-impaired user's communication device and the relay service. The captioning communication session may pass text captions from the relay service to the hearing-impaired user's communication device. In some embodiments, the captioning communication session may also include the hearing-impaired user's communication device transmitting the far-end user's audio signal to the relay service to generate the text captions.

The term "audio signal" (or voice signal) refers to the signal generated and transmitted by a communication device during a call. Most examples are provided from the perspective of a hearing-impaired user using a captioning communication device, such that the audio signal captured by that device is sometimes referred to as the "near-end audio signal," and the audio signal received to be reproduced by the speaker is sometimes referred to as the "far-end audio signal."

As used herein, "converging" and other forms of the base word "converge" refer to a state of an adaptive filter in which the error is reducing (i.e., approaching zero error). Similarly, "diverging" and other forms of the base word "diverge" refer to a state of the adaptive filter in which the error is increasing (i.e., moving away from zero).

The "history" of a signal refers to past and present values of a signal. As a practical matter, past values within a recent window of time may be used for the history when determining the activity of a signal as discussed further below.

Embodiments of the disclosure span a variety of functions in a variety of applications. Embodiments of the disclosure are described below with reference to communication devices for the hearing impaired. For example, the communication device may include any of a text-captioned communication device, a video communication device, an amplified audio communication device, and combinations thereof that are specifically configured for use by hearing-impaired users. It should be noted, however, that embodiments of the disclosure may include any application or environment where echo cancellation in audio signals is desirable. For example, it is contemplated that embodiments of the disclosure may include communication devices for hearing-capable users, such as speaker phones, telephones, handsets, headsets, conference phones, smart phones, cellular phones, tablet computers, personal computer, a notebook computer, hands-free phone systems in cars, communication devices operated in a hands-free mode, and other suitable communication devices that may incorporate echo cancellation. Embodiments of the disclosure include echo cancellation of hybrid echo and/or acoustic echo.

FIG. 1 is a simplified schematic block diagram of a communication device 100 according to an embodiment of the disclosure. As an example, the communication device 100 may be specifically configured for use by a hearing-impaired user to establish calls with other communication devices and captioning communication sessions with a communication service configured to assist the hearing-impaired user (see, e.g., FIG. 6). Other types of communication devices are also contemplated as being within the scope of this disclosure, which include an echo canceller configured to reduce echo (e.g., acoustic, hybrid) as described more fully with reference to FIGS. 2 through 5. The echo canceller refers to the adaptive filter that removes the echo by subtraction from an incoming signal.

The communication device 100 may include a processor 110 operably coupled with an electronic display 120, communication elements 130, a memory device 140, and input devices 150. In some embodiments, the communication device 100 may include a camera for also participating in a video communication session. The processor 110 may coordinate the communication between the various devices as well as execute instructions stored in computer-readable media of the memory device 140. The processor 110 may be configured to execute a wide variety of operating systems and applications including the computing instructions. The memory device 140 may be used to hold computing instructions, data, and other information for performing a wide variety of tasks including performing embodiments disclosed herein. By way of example and not limitation, the memory device 140 may include Synchronous Random Access Memory (SRAM), Dynamic RAM (DRAM), Read-Only Memory (ROM), Flash memory, and the like. The memory device 140 may include volatile and non-volatile memory storage for the communication device 100.

The communication elements 130 may be configured to communicate with other devices or communication networks, including other communication devices and the relay service. As non-limiting examples, the communication elements 130 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols. The input devices 150 may include a numeric keypad, a keyboard, a touchscreen, a remote control, a mouse, buttons, other input devices, or combinations thereof.

The communication device 100 may further include a plurality of different components through which the user may communicate. In particular, the communication device 100 may include a handset 160 and a speakerphone 170. The handset 160 may be a handheld device having a microphone for the hearing-impaired user to speak into and capture the near end audio to transmit to the far-end communication device, as well as a speaker for the hearing-impaired user to hear the far-end audio produced by the speaker. The handset 160 may be coupled to the base unit of the communication device 100 through a cord or as a cordless handset. The speakerphone 170 may include a microphone and a speaker that are integrated into the base unit of the communication device 100. In some embodiments, the communication device 100 may also be compatible to communicate with a headset 180 having its own speaker and microphone. The headset 180 is typically worn by the hearing-impaired user to position the speaker close to the hearing-impaired user's ear and the microphone close to the hearing-impaired user's mouth. The headset 180 may be coupled to the base unit through a cord or as a cordless headset (e.g., via Bluetooth connection). In some embodiments, the headset 180 may not include its own microphone. In such embodiments, the microphone of the speakerphone 170 may be used.

The communication device 100 may be configured to be operated in one of a handset mode, a speakerphone mode, and a headset mode according to the desired method by the hearing-impaired user. Additional audio modes are contemplated as other devices may be used to provide a speaker and/or a microphone for the communication device 100. For example, a mobile device (e.g., smartphone, tablet, etc.) may be used to provide some of the functionality of the microphone and/or the speaker for the hearing-impaired user. In addition, different types of handsets or headsets may be employed. For example, a hearing-impaired user may have different types of headsets that may be used by one or more different users of the communication device, such as a headset that may rest over the ear, be inserted into the ear, be connected to or integrated into eyewear or a hearing-aid, or another configuration.

Each of the different modes may create a different acoustic environment for the communication device 100, which may cause different characteristics of the acoustic echo caused by the feedback (e.g., direct and/or indirect) from speaker to microphone. For example, the echo paths of the audio generated by the speakerphone 170 may be much different than the echo path of the audio generated by the handset 160. Likewise, if a headset 180 is used, the echo path may also be different than the other modes. Because the communication device 100 is configured primarily for hearing-impaired users, the effects and differences in the echo characteristics may be even more different than the typical phone system. This is because the speakers used in the different components of the communication device 100 may include large gains in the amplifier, and produce louder volume levels than typical phones.

In order to reduce echo (e.g., acoustic, hybrid), an echo canceller is employed. In particular, the processor 110 is configured to execute an echo canceler that processes the near-end audio signal generated by the microphone and/or the far-end audio signal received from the far-end communication device. Embodiments of the disclosure include a two-path echo canceller that includes a fixed foreground filter configured to cancel echo, and an adaptive background filter configured to learn the echo path response. The coefficients of the adaptive background filter may be transferred to the fixed foreground filter responsive to a set of fixed conditions are satisfied. History based transfer logic may be employed to improve performance of the echo canceller during double talk and barge-in events. Operation of the echo canceller is described below with respect to FIGS. 2 through 5.

Figure 2:
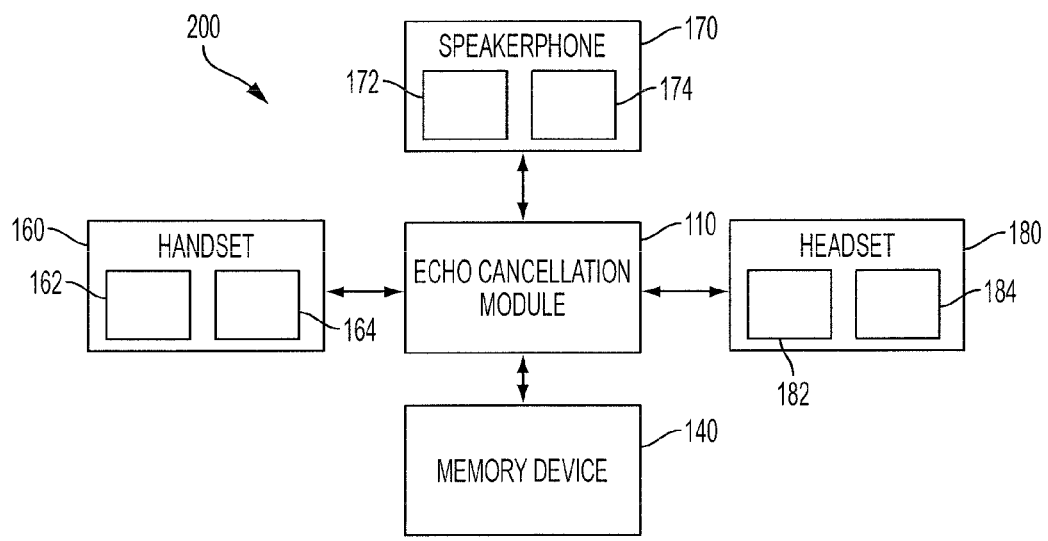
FIG. 2 is a simplified block diagram of a communication device according to an embodiment of the disclosure.

FIG. 2 is a simplified block diagram of a communication device 300 according to an embodiment of the disclosure. The handset 160 includes a microphone 262 and a speaker 164. The speakerphone 170 includes a microphone 172 and a speaker 174. The headset 180 may include a microphone 182 and a speaker 184. Each of the handset 160, speakerphone 170, and headset 180 may communicate with an echo cancellation module 210 (executed by the processor 110 in FIG. 2). For example, the echo cancellation module 210 may receive the far-end audio signal (passed onto each of the speakers 164, 174, 184) as well as each of the near-end audio signals captured by each microphone 162, 172, 182. The source of the near-end audio signal used by the echo cancellation module 210 may depend on which microphone 162, 172, 182 is currently in use for a particular mode. In some embodiments, one microphone may be enabled while the others may be disabled. In some embodiments, each of the near-end audio signal lines may be received by a multiplexer that passes the appropriate near-end audio signal into the filters of the echo cancellation module 210 according to the selected mode. The memory device 140 may also be coupled to the echo cancellation module 210. The memory device 140 may have the different sets of training parameters stored therein corresponding to each of the modes, such as is described in U.S. patent application Ser. No. 14/679,922, filed Apr. 6, 2015, entitled "Device, System, and Method for Performing Echo Cancellation in Different Modes of a Communication Device," the disclosure of which is incorporated herein in its entirety by this reference. Operation of the echo cancellation module 210 will be discussed below.

Figure 3:
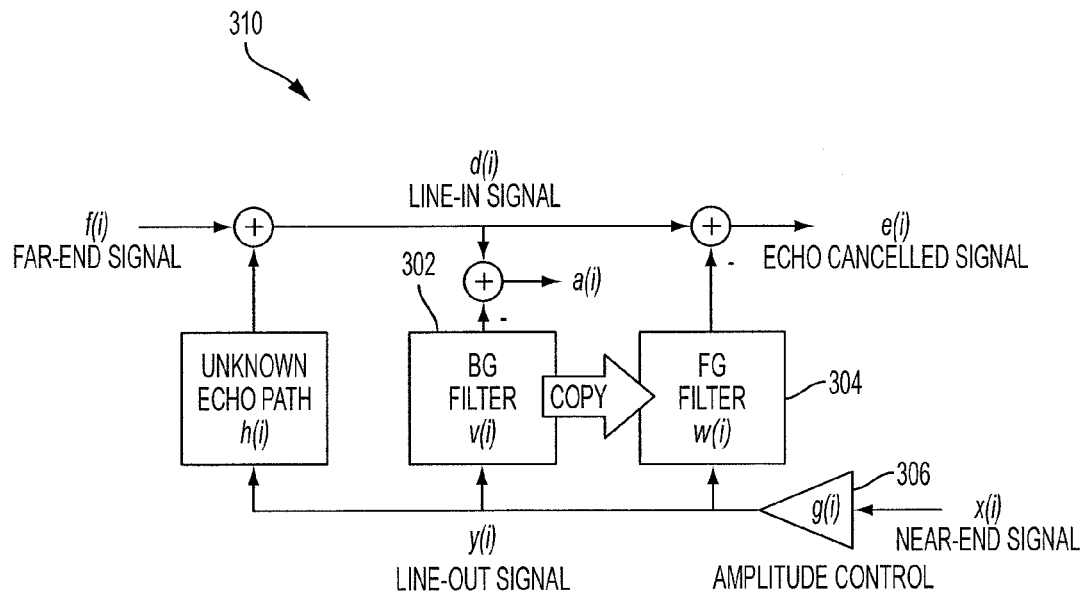
FIG. 3 is a simplified block diagram of an echo cancellation module according to an embodiment of the disclosure.

FIG. 3 is a simplified block diagram of an echo cancellation module 310 according to an embodiment of the disclosure. The echo cancellation module 310 may receive a far-end signal f(i) and a near-end signal x(i), and generate an echo canceled signal e(i) from a difference between a line-in signal d(i) and a filtered version of the line-out signal y(i). The line-in signal d(i) may be the sum of the far-end signal f(i) and the echo h(i)*y(i) of the line-out signal y(i). The line-out signal y(i) may be an amplitude controlled version of the near-end signal x(i). The unknown echo path h(i) may correspond to the hybrid impulse response from a hybrid circuit.

The echo cancellation module 310 may include a background (BG) filter 302 and a foreground (FG) filter 304 in a two-path configuration for echo cancellation to estimate the energy of the far-end signal, in which the FG filter 304 performs the actual error cancellation on a line-in signal d(i), while the BG filter 302 generates an output error a(i) that is used to determine when the FG filter 304 may be updated. The echo cancellation module 310 may further include an amplitude control block 306 that is configured to control the amplitude of the near-end signal x(i) according to a gain g(i) to generate the line-out signal y(i). As a result, the line-out signal y(i) received by each of the BG Filter 302 and the FG filter 304 may be the product (i.e., g(i)x(i)) of the near-end signal x(i) and the gain g(i) from the amplitude control block 306.

The BG filter 302 may be an adaptive filter configured to continuously update its coefficients, while the FG filter 304 may be a fixed filter (i.e., non-adaptive filter) that does not continuously adjust its coefficients during operation thereof. Rather, the coefficients of the FG filter 304 may be updated (e.g., copied from the BG filter 302) responsive to conditions of both the near-end signal energy and the estimated far-end signal energy being satisfied over a recent history of the signals. The history includes past values of the near-end signal energy and the estimated far-end signal energy within a pre-determined window of time. This is different than prior methods that used a summary of the entire history of the signals in a single statistic such as the short term average signal energy. Such statistics may be too quantized to give a clear picture of the history of a signal.

In prior work on the two-path approach, the normalized least mean square (NLMS) adaptive algorithm is universally used. The mean squared error (MSE) of NLMS adaptive filters exhibit two phases: (1) a learning phase in which the MSE decreases from a large value to a small value, and (2) a converged phase in which a steady, low MSE is observed. The second learning behavior of adaptive filters needing emphasis is that interfering signals prevent correct learning from taking place. In line echo cancellation, an active far-end signal prevents the adaptive BG filter from learning the correct echo path. Short term correlations between near-end and far-end speech cause the BG filter to cancel the far-end signal and echoes of the near-end signal are introduced.

The fitness of the BG filter 302 may be understood better by examining the history of its inputs and outputs than by considering only a few summarizing statistics such as short-term average energy. The BG filter 302 will have converged close to the true echo path if two conditions on the signal history are satisfied. Because adaptive filters may require an excitation signal in order to learn, and a learning period before reaching convergence, the first condition may include the near-end signal x(i) currently being active and has also been active in the recent history. The second condition may include that over this same learning period, the far-end signal f(i) (which acts as interference) should be small enough to be considered inactive in the recent history. For later reference, these two conditions may be referred to as: Condition C1: the near-end signal is active in recent history for a pre-determined time window; and Condition C2: the far-end signal is inactive in recent history for a pre-determined time window.

If both Conditions C1 and C2 are satisfied, then the adaptive BG filter 302 may have converged close to the true echo path. Conditions C1 and C2 may depend on the history of signals associated with the BG filter 302. A single short-term energy gives only coarse information about signal levels over the averaging window, whereas the history presented herein provides a more complete picture and over a longer period of time. As a result, history-based information may be incorporated into the transfer logic in two-path echo cancellation with negligible computational overhead. It is noted that such histories may require storage; however, computer memory may be a more readily available resource than computational clock cycles.

The fitness of the BG filter 302 is determined by analyzing conditions C1 and C2 described above. In other words, for the BG filter 302 to converge to a good estimate of the echo path, both conditions C1 and C2 may be needed. Condition C1 indicates that the excitation of the near-end signal x(i) has been present for a sufficient length of time for the adaptive filter (i.e., the BG Filter 302) to converge, and condition C2 indicates that, over the learning period, interference from the far-end signal f(i) has been negligible (e.g., double talk is minimal).

Thus, the activity level of each of the near-end signal x(i) and the far-end signal f(i) may be determined. The echo cancellation module 310 may monitor the signal energy at two points related to the short-term energy of each of the near-end signal x(i) and the far-end signal f(i). In some embodiments, the point at which the short-term energy of the near-end signal x(i) may be monitored is prior to the amplitude control block 306. In other embodiments, the point at which the short-term energy of the near-end signal x(i) may be monitored is after the amplitude control block 306. Determination of the activity level of the far-end signal f(i) may be based, in part, on detecting when the far-end signal f(i) is inactive (e.g., when f(i)≈0). Rather than using an estimator of the actual far-end signal f(i), the echo cancellation module 310 may monitor the adaptive echo canceled signal a(i) (i.e., the output from the BG filter 302) as a surrogate for the short term energy of the far-end signal f(i). Additional particulars of monitoring each of these signals is discussed below.

Referring first to the near-end signal x(i), the current activity level of the near-end signal x(i) may be determined by measuring its short-term energy (e.g., variance $\sigma^2_x(i)$) around the current time i. The history $H_x(i)$ of the near-end signal x(i) at time i is a record of the short-term energy $\sigma^2_x(j)$ over a predetermined time window (L). The predetermined time window (L) may be the last L number of samples such that the predetermined time window may be referred to as a recent history that is continually updating over time.

$$H_x(i) = \{\sigma_x^2(j), j=i, i-1, i-2, \ldots, i-L\}. \tag{1}$$

In some embodiments, the historical activity level of the near-end signal x(i) may be determined by counting the number of times (e.g., count $K_x(i)$) that its short-term energy $\sigma^2_x(i)$ exceeds a predetermined energy threshold $T_x$ over the predetermined time window (L), $$K_x(i) = \sum_{j=i-L}^{i} I(\sigma_x^2(j) > T_x), \tag{2}$$

where I(•) is the indicator function which is 1 when its argument is true and 0 otherwise. A sliding-window version of this counting process may be implemented efficiently and exactly by saving the indicator values $I(\sigma^2_x(i) > T_x)$ in a circularly indexed buffer. At time i before overwriting the oldest value in the buffer $I(\sigma^2_x(I-L))$ with the new value $I(\sigma^2_x(i))$, the old value is subtracted from the count $K_x(i)$. Then the new value is added to the count $K_x(i)$ and written into the circularly indexed buffer. At the expense of some computer memory and for very low computational cost, this process may continuously monitor the number of times over the history window (i.e., the predetermined time window (L)) that the short-term signal energy exceeds the predetermined threshold $T_x$.

In some embodiments, the near-end signal x(i) is considered to be active if the count $K_x(i)$ exceeds a predetermined number of counts, which may be based on a fraction $F_x$ of the recent history window L, $$\begin{cases} K_x(i) \geq F_x L, & \text{near-end is active,} \\ K_x(i) < F_x L, & \text{near-end is not active.} \end{cases} \tag{3}$$

Using the fraction $F_x$ allows some fluctuations in the instantaneous value of the short-term energy and still allows the near-end signal x(i) to be considered active. This measure of the history of the near-end signal x(i) brings significantly more information to make decisions about BG-FG filter updates than using a single summarizing statistical quantity. Using history information, we can be more certain about the quality of the BG filter 302 before transferring its coefficients to the FG filter 304. The history length (L) and the fraction ($F_x$) can be set to allow sufficient time for the BG filter 302 to reach convergence. In some embodiments, the fraction $F_x$ may be set in the interval $0.7 \leq F_x \leq 1$.

It is noted that the equations (2) and (3) above are based on the definition of the count $K_x(i)$ being defined as the number of times that the short-term energy $\sigma^2_x(i)$ exceeds a predetermined threshold $T_x$ over the predetermined time window (L). Of course, it is contemplated that the count $K_x(i)$ may alternatively be defined as the number of times that the short-term energy $\sigma^2_x(i)$ s less than a predetermined threshold $T_x$ over the predetermined time window (L). In such an embodiment, the near-end signal x(i) would be considered active if the count is less than the fraction $F_x$ of the history window L (which may also be set at a different interval, such as $0 \leq F_x \leq 0.7$ due to the different situation being counted).

Referring now to the far-end signal f(i), the current activity level of the far-end signal f(i) may be determined by measuring the short-term energy (e.g., variance $\sigma^2_a(i)$) around the current time i for the adaptive echo canceled output a(i) over the predetermined time window (L). The line-in signal d(i) is shown as the sum of the far-end signal f(i) and echo h(i)*y(i) of the line-out signal y(i), $$d(i) = f(i) + h(i) * y(i). \tag{4}$$

Similarly, the adaptive echo canceled output a(i) of the BG filter 302 is given by:

$$a(i) = d(i) - v(i) * y(i) = f(i) + [h(i) - v(i)] * y(i). \tag{5}$$

The short-term energy (e.g., variance) $\sigma^2_a(i)$ of adaptive echo canceled output a(i) at time i is given by:

$$\sigma_a^2(i) = \sigma_f^2(i) + (h-v)^T R_y(i)(h-v), \tag{6}$$

where $\sigma^2_f(i)$ is the short-term energy of the far-end signal f(i), $R_y(i)$ is the covariance matrix of y(i) and h, v are vectors constructed from the echo path impulse response and the coefficients of the BG filter 302. Note that the diagonal elements of $R_y(i)$ are approximately equal to $\sigma^2_x(i)$. An assumption built in to equation (6) is that the near-end signal x(i) and far-end signal f(i) are uncorrelated.

Determining when the far-end signal f(i) is inactive may be based on quantities, such as $\sigma^2_a(i)$ and either $R_x(i)$ or $\sigma^2_x(i)$ that can be measured directly. Expressed mathematically, the condition of interest is $\sigma^2_f(i) \approx 0$. There are several cases to consider with regard to equation (6). First note that $\sigma^2_a(i) \approx 0$ if $\sigma^2_f(i) \approx 0$ and $\sigma^2_x(i) \approx 0$ regardless of the value of h–v. This case is both easy to detect and not of interest because it is the case in which there is no excitation for adaptive learning. In the case in which there is excitation for adaptive learning $\sigma^2_x(i) \gg 0$, it is possible for $\sigma^2_a(i) \approx 0$ by requiring that (i $\sigma^2_f(i)) \approx 0$ and v≈h. This is the case of interest. It is detected using histories on $\sigma^2_x(i)$ and $\sigma^2_a(i)$. Define the history $H_a(i)$ for the echo canceled output $a(i)$ of the BG filter 302 similar to $H_x(i)$ in equation (1). Also define the threshold $T_a$, count $K_a(i)$, and fraction $F_a$ similar to what was done previously in equations (2) and (3). Determining that the far-end signal f(i) is inactive is done through the BG echo canceler output a(i). Thus, the BG Filter 302 serves two purposes: (1) the BG Filter 302 is used to learn the impulse response of the unknown echo path and its coefficients are copied over to the FG filter 304; and (2) the BG Filter 302 is used to detect the absence of the far-end signal f(i).

As discussed above, to determine that the near-end signal x(i) is active, the fraction $F_x$ may be set closer to one than zero (e.g., between the interval of $0.7 \leq F_x \leq 1$). Thus, the short-term energy in the near-end signal x(i) may be required to exceed the threshold $T_x$ over most of the history interval (L) to be considered active. The opposite logic may be used to determine if the far-end signal f(i) is inactive. For example, the fraction $F_a$ is set closer to zero than one (e.g., between the interval of $0 \leq F_a \leq 0.05$). It is also recognized that the count value $K_a(i)$ and count threshold may be based on the number of times the short term energy of the estimated far-end signal (e.g., adaptive echo canceled output a(i)) is above its energy threshold $T_a$. Thus, the adaptive echo canceled output a(i) would be considered inactive if the count is greater than the fraction $F_x$ of the history window L (which may also be set at a different interval, such as $0.05 \leq F_x \leq 1$ due to the different situation being counted). Thus, the short-term energy in the far-end signal f(i) (which acts as interference in adaptive learning) as estimated by the adaptive echo canceled output a(i) may be required to be below its predetermined threshold for a small percentage of the time over the history window (L) to be considered inactive. Making coefficient transfer conditions based on both of these signal histories may result in high confidence that the BG filter 302 has converged to the echo path.

Figure 4:
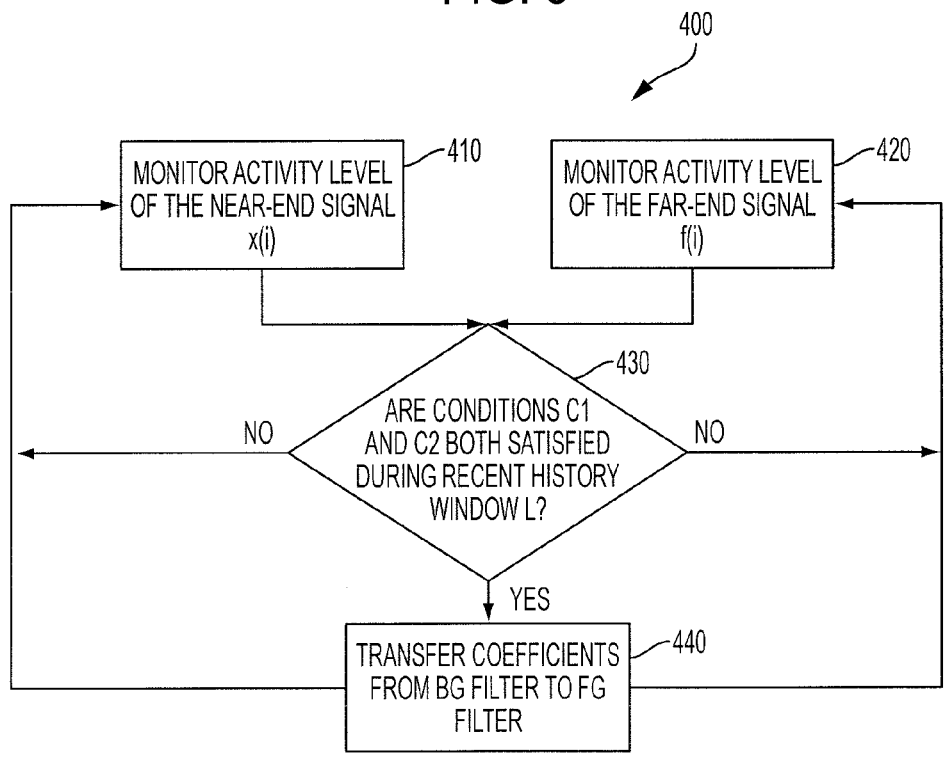
FIG. 4 is a flowchart illustrating a method of performing echo cancellation according to an embodiment of the disclosure.

FIG. 4 is a flowchart 400 illustrating a method of performing echo cancellation according to an embodiment of the disclosure. As discussed above, the echo canceller may include a BG Filter 302 (FIG. 3) and a FG Filter 304 (FIG. 3), in which the BG Filter 302 is an adaptive filter that transfers its coefficients to the FG Filter 304 that is used to subtract the echo from the line-in signal d(i) to generate the echo canceled signal e(i) that is transmitted to the user.

At operation 410, the activity level of the near-end signal x(i) received by a communication device may be monitored. As discussed above, the activity level of the near-end signal x(i) may be based on monitoring a recent history of the near-end signal x(i) to determine if a Condition C1 is satisfied. Condition C1 being satisfied indicates that the near-end signal x(i) is active.

Similarly, at operation 420, the activity level of the far-end signal f(i) may be monitored. As discussed above, the activity level of the far-end signal f(i) may be based on monitoring the recent history of an output a(i) of the BG Filter 302 to determine if a Condition C2 is satisfied. The output a(i) of the BG Filter 302 may be used as a proxy for the far-end signal f(i). Condition C2 being satisfied indicates that the far-end signal f(i) is inactive.

The recent histories may be defined by a time window L that is for a predefined amount of time (e.g., number of samples) that includes the current measurement of the respective signal in addition to the historical values that precede it. In some embodiments, these values may be stored in a circular buffer for each of the near-end signal x(i) and the output a(i) of the BG Filter 302 so that new sampled values replace the oldest sampled values to ensure that the predefined number of sampled values for each signal are monitored at a time.

At operation 430, it is determined if Conditions C1 and C2 both are satisfied during a recent history window L. Condition C1 may be satisfied if a count $K_x$ of the sampled values exceeding a predetermined energy threshold exceeds a count threshold. The count threshold may be based on a fraction $F_x$ of the time window L (i.e., count threshold=$F_xL$). Condition C2 may be satisfied if a count $K_a$ of the sample values less than a predetermined energy threshold is also less than a count threshold. The count threshold may be based on a fraction $F_a$ of the time window L (i.e., count threshold=$F_aL$).

If both Conditions C1 and C2 are satisfied at the same time, the coefficients of the BG Filter 302 may be transferred to the FG Filter 304 at operation 440. If not (e.g., only one Condition or neither Condition is satisfied), then the method continues to monitor the activity levels of the near-end signal x(i) and the far-end signal f(i) to determine when both Conditions C1 and C2 are satisfied.

As a result, a recent history may be built into the control logic in order to obtain a more accurate picture of the state of the near-end signal and the far-end signal. Previously, reference to the short-term energy of these signals was the instantaneous values of these energies. However, because the BG filter 302 is a learning matching, and learning takes place over time, the condition of the BG filter 302 may depend not just on the current state of the near-end and far-end signals but on the recent history of these signals. Because it takes time for the BG Filter 302 to learn the response of the echo path, the BG Filter 302 needs to see strong near-end energy over a period of time and during that same period the far-end signal should also be small. Given that these conditions are satisfied, it may be assumed that the BG filter 302 is properly adjusted.

The BG filter 302 may be implemented as a recursive least squared (RLS) filter. There are many different algorithms for RLS adaptive filters that may be used by the BG filter 302. For example, the RLS adaptive filter may implement an algorithm selected from the group consisting of a covariance-matrix-based RLS algorithm and its square root versions (also referred to as an "RLS algorithm") that use a tapped-delay line parameterization and the matrix inversion lemma, an order-recursive RLS algorithm (also referred to as an "RLS-Lattice" algorithm) that use a lattice structure for the filter parameterization and error computation, and a so-called fast fixed-order RLS algorithm (also referred to an "RLS-Array" algorithm).

In some embodiments, the covariance-based algorithms, and may require on the order of $L^2$ computations per filter update. The RLS-Array algorithms may require about 7 L computations per update, but can be somewhat numerically unstable. Monitoring and rescue mechanisms may be used to restart these filters when instability is detected. The RLS Lattice algorithms may require about 16 L computations per update, but they are numerically stable.

One potential disadvantage with RLS Lattice algorithms is that they may require a special procedure be followed when halting and restarting updates and when copying coefficients from one filter to another. For example, when stopping adaptive updates using the lattice algorithms, the BG filter 302 may need to be driven to the all-zero state by running zeros into the reference input. Once in the all-zero state, the adaptive updates can be halted and the filter coefficients can be copied from the BG filter 302 to the FG filter 304. Restarting the BG filter 302 may be accomplished by beginning in the all-zero state. Thus, the copy procedure must be timed and executed according to this procedure. In a practical system, instantly setting the near-end signal x(i) to zero can cause audible clicks to the far-end user. Therefore, the BG filter 302 may be transitioned through a sequence of states. In one state, the amplitude of the near-end signal x(i) is ramped down to zero gradually over time. In the next state, zeros are passed into the BG filter 302 until the BG filter 302 is filled with zeros. At this point, the BG filter 302 coefficients may be copied over to the FG filter 304. In the last state, the amplitude of the near-end signal x(i) may be ramped back up to its natural level as the zeros exit the BG filter 302. As discussed above, the amplitude control block g(i) may be included in the block diagram above to indicate control of the amplitude of the near-end signal x(i). When the near-end signal x(i) is the input to this control block, the output is g(i)x(i). Additional information regarding halting and restarting an RLS-Lattice algorithm is found in J. Gunther, Wang Song, and T. Bose, "Stopping and restarting adaptive updates to recursive least-squares lattice adaptive filtering algorithms," in Adaptive and Learning Systems, 2006 IEEE Mountain Workshop on, July 2006, pp. 1-6, the disclosure of which is incorporated by reference herein in its entirety by this reference.

Figure 5:
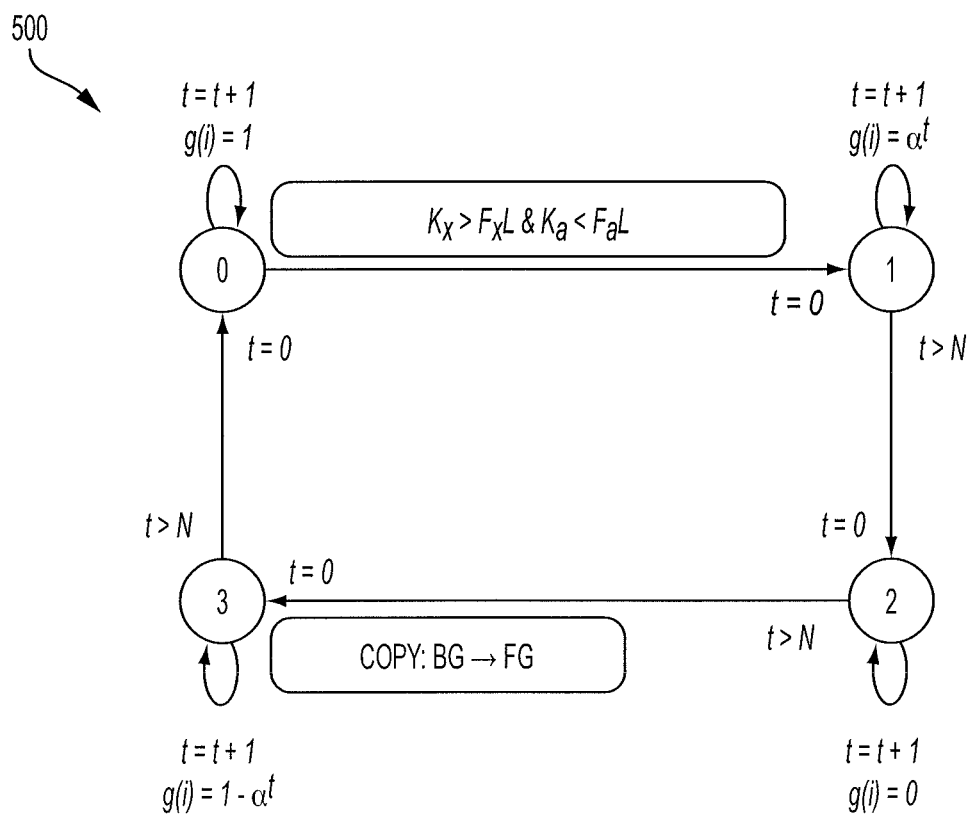
FIG. 5 is a state machine illustrating the control mechanism for transferring the coefficients from the BG filter to the FG filter according to an embodiment of the disclosure.

FIG. 5 is a state machine 500 illustrating the control mechanism for transferring the coefficients from the BG filter 304 to the FG filter 306 according to an embodiment of the disclosure. The description below with respect to FIG. 5 assumes the use of an RLS lattice adaptive filter; however, it is recognized that the steps may be modified if a different adaptive filter algorithm is used as would be recognized by those of ordinary skill in the art.

In each state, a counter may be incremented and some action is performed on the signal amplitude scaling factor g(i) for the amplitude control block 306 (FIG. 3). The exit condition for each state is placed next to the state and on the exterior of the state diagram. The entry condition for each states appears at the end of the arrow/edge entering the state on the interior of the state diagram. For example, the counter (t) may be reset to t=0 when all states are entered.

State 0 is the normal operation of the echo cancellation module. The exit condition of state 0 is explained below. $K_a$ and $K_x$ may be counts of the number of times that $Ea(i) > T_a$ and $Ex(i) > T_x$, respectively, in the last L samples defined by the time window for the recent history. $T_a$ and $T_x$ are the predefined energy thresholds that indicate whether the signals are active. Each of the counts $K_a$ and $K_x$ may be compared to a respective count threshold, which may be a predefined number that may be based on a fraction ($F_x$, $F_a$) of the time window L. As an example, if count $K_x$ is greater than $F_xL$, Condition C1 may be satisfied indicating that the near-end signal is active. If count $K_a$ is less than $F_aL$, Condition C2 may be satisfied indicating that the far-end signal is inactive. If both Conditions C1 and C2 are satisfied, the state machine may exit state 0. The predetermined values for $K_a$; $K_x$; $T_a$; $T_x$, L, $F_a$, and $F_x$, may depend on a variety of factors (e.g., gain in the system, sample rate, etc.). In some embodiments, these values may be set empirically as user-defined coefficients.

The exit condition for states 1, 2 and 3 may include the timer condition t>N being satisfied, where N is a predetermined number of cycles sufficient to delay the entering into the next state to accomplish the purposes of the respective state. The purpose of state 1 may be to let the signal amplitude g(i) decay (i.e., attenuate) gradually to zero following an exponential decay. The value of α may be set so that g(i) decays from 1 to a negligible number in N time steps. The purpose of state 2 may be to set the amplitude of the line-out signal y(i) to zero to drive the BG filter 302 (FIG. 3) to the all-zero state (recall that the filter has length N so the all-zero state is reached after N time steps). Once in the all-zero state, the coefficients from the BG filter 302 may be copied over to the FG filter 304. This copy operation may be performed in the transition from state 2 to state 3. The purpose of state 3 may be to ramp the amplitude scaling of the line-out signal y(i) from zero back up to full scale (e.g., 1). Then the state is returned to state 0 which is the normal mode of operation for echo cancellation and monitoring the conditions C1 and C2 to again trigger a transfer of coefficients from the BG Filter 302 to the FG Filter 304.

To avoid repeating the cycle through states 1, 2 and 3 too frequently, an additional timer condition (e.g., t>T condition may also be added to the exit condition for state 0 in some embodiments. In some embodiments, the timer condition T may be set at the same value as the recent history window L, the same as timer condition N (for states 1, 2, and 3) or at some other value that is different (e.g., more or less) than either the recent history window L or the timer condition N. In addition, as shown in FIG. 4, each state 1, 2, 3 may have the same value N to use as its timer condition; however, it may be desirable for each state 1, 2, 3 to have its own value to use as its timer condition as the time that is needed to accomplish the purpose of the respective state. For example, state 1 may have an exit condition of $t>N_1$, state 2 may have an exit condition of $t>N_2$, state 3 may have an exit condition of $t>N_3$, wherein $N_1$, $N_2$, and $N_3$ are different values.

Figure 6:
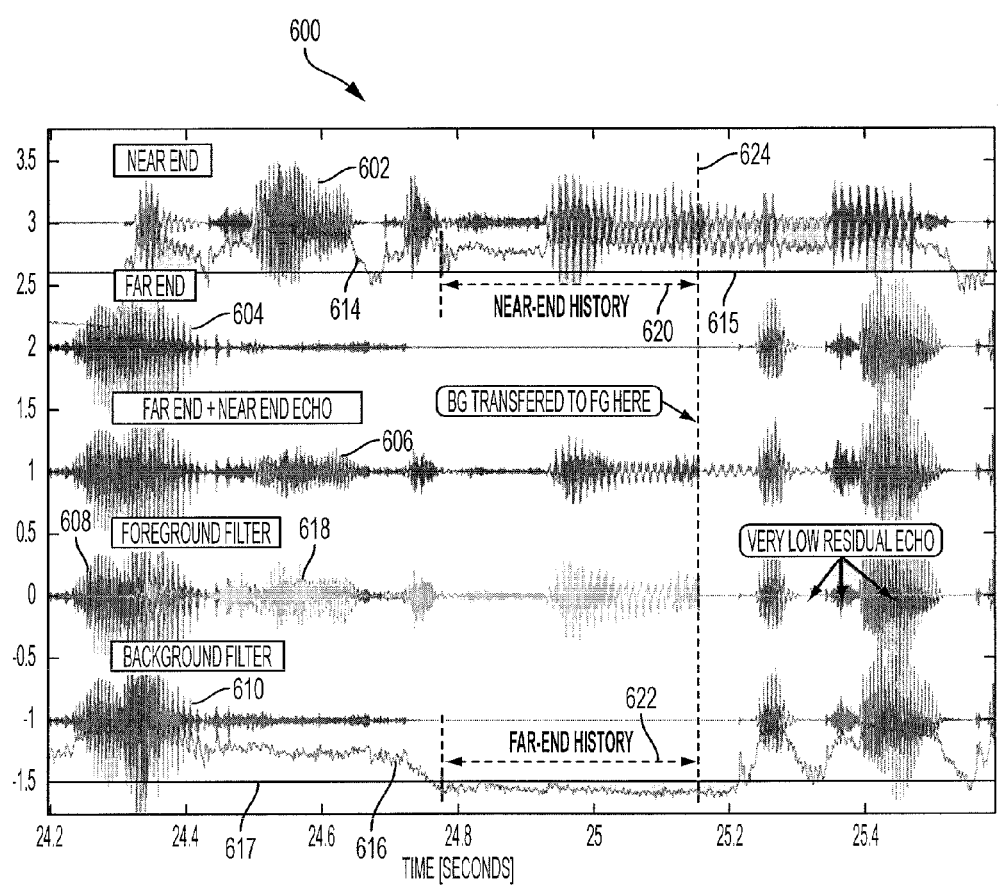
FIG. 6 shows simulation results of the echo cancellation module according to an embodiment of the disclosure

FIG. 6 shows simulation results 600 of the echo cancellation module according to an embodiment of the disclosure. The simulation results depict a short segment of various signals near the time when a coefficient transfer occurs. The simulation results 600 use the speech files defined in IEEE Standard 269 in a line echo simulation. Signal 602 is the near-end signal x(i), signal 604 is the far-end signal f(i), signal 606 is the line-in signal d(i) (i.e., the far-end signal plus echo), signal 608 is the FG filter output, and signal 610 is the BG filter output. In addition, signal 614 is the near-end signal energy, and signal 616 is the estimated far-end signal energy. As discussed above, the estimated far-end signal energy may be determined from using the output from the BG Filter as a proxy for the far-end signal. Signal 618 is the FG Filter's residual echo.

The near-end recent history 620 and far-end recent history 522 are also shown to be periods in which both the estimated far-end signal energy 616 and the near-end signal energy 614 satisfy pre-determined conditions C1 and C2. For example, the near-end signal energy 614 and the estimated far-end signal energy 616 may be compared with respective thresholds 615, 617. Threshold 615 may correspond to energy threshold $T_x$, and threshold 617 may correspond to energy threshold $T_a$ discussed above. If the near-end signal energy 614 is above its threshold 615, the near-end signal 602 may be considered active. If the estimated far-end signal energy 616 is below its threshold 617, the far-end signal 604 may be considered inactive. Because the BG filter 302 is adaptive, a learning period is required before coefficient transfers should take place. During this period the near-end signal 602 should be active and the far-end signal 604 should be inactive. The signal histories 622, 624 indicate of the occurrence of both these conditions being satisfied. Thus, if both conditions (e.g., near-end signal energy 614>threshold $T_x$ 615 & estimated far-end signal energy 616<threshold $T_a$ 617) are satisfied for a pre-determined period of time, the filter coefficients may be transferred from the BG filter 302 to the FG filter 304 at a time indicated by line 624. As shown in FIG. 5, after the coefficient transfer (i.e., FG filter update) occurred, the FG residual echo 618 is reduced indicating that the coefficient transfer occurred at the correct time.

Figure 7:
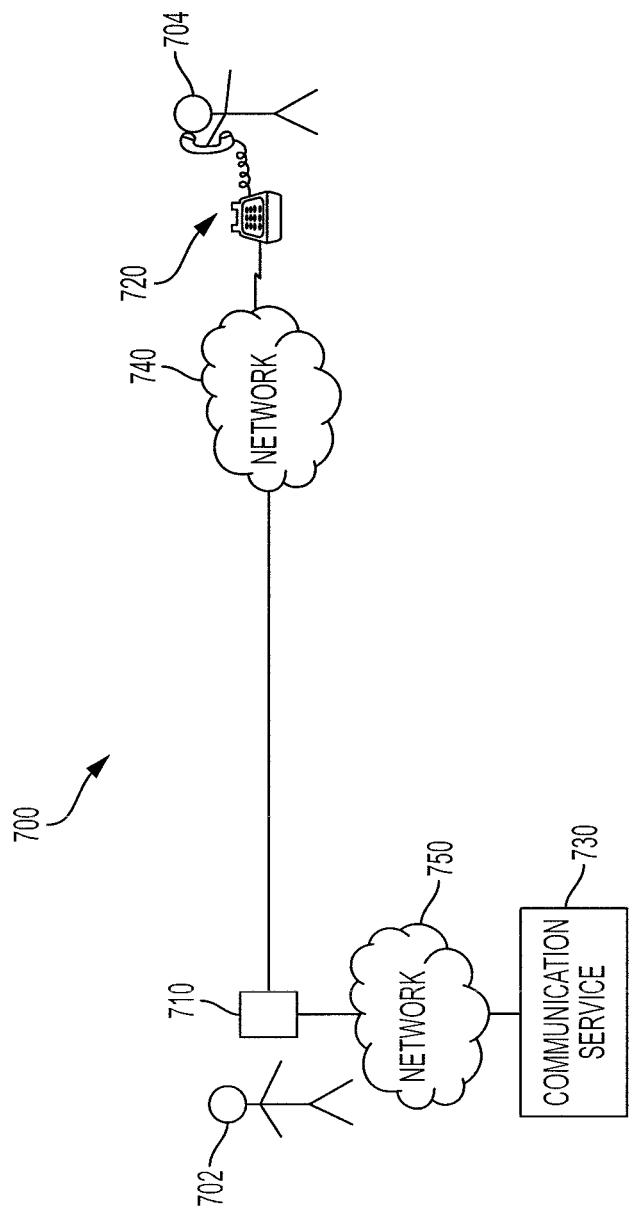
FIG. 7 illustrates a communication system configured to facilitate an assisted call between a hearing-impaired user and a far-end user.

FIG. 7 illustrates a communication system 700 configured to facilitate an assisted call between a hearing-impaired user 702 and a far-end user 704. The communication system 700 may include a first communication device 710, a second communication device 720, and a relay service 730. The first communication device 710 and the second communication device 720 may be coupled together to facilitate communication therebetween via a first network 740. The first communication device 710 and the relay service 730 may be coupled together to facilitate communication therebetween via a second network 750. For example only, the first network 740 and the second network 750 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 740 and the second network 750 may be the same network (e.g., both connections may be Internet-based connections). Thus, discussion of the first network 740 and the second network 750 separately may be for convenience of discussing a particular connection between two or more devices. Of course, in some embodiments, the first network 740 and the second network 750 may be different networks. For example, the first communication device 710 and the second communication device 720 may communicate via a PSTN network connection, while the first communication device 710 and the second communication device 720 may communicate via an internet connection. Other variations and combinations of networks are also contemplated.

The first communication device 710 may include a device that is configured to assist the hearing-impaired user 702 in communicating with another individual (e.g., far-end user 704). In some embodiments, the first communication device 710 may include a caption-enabled communication device configured to receive and display text captions of at least a portion of the conversation. Thus, the hearing-impaired user 702 may be able to read the text captions of the words spoken by the far-end user 704 to supplement the far-end audio signal that is reproduced into sound by the first communication device 710. As a result, the hearing-impaired user 702 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the first communication device 710 may also be configured to receive and display video on an electronic display on the first communication device 710. The communication device 710 may be a caption enabled communication device, which may be implemented as a standalone device (e.g., a caption phone), or as implemented on another device (e.g., tablet computer, laptop computer, smart phone, etc.).

The second communication device 720 may comprise a conventional voice telephone (e.g., landline phone, cellular phone, smart phone, VoIP phone, etc.). As such, the far-end user 704 may interact in a conventional manner with the second communication device 720. In some embodiments, the second communication device 720 may be configured similarly as the first communication device (e.g., caption-enabled communication device). As a result, the second communication device 720 may likewise be operated by a hearing-impaired user. Thus, although facilitating communication between the hearing-impaired user 702 and the far-end user 704 is shown in FIG. 7 to imply that the far-end user 704 is a hearing-capable user, such a situation is shown only as an example. Other embodiments include both the first communication device 710 and the second communication device 720 coupled to the relay service 730 to facilitate the captioning services for each respective hearing-impaired user (not shown). In such a situation, each communication device 710, 720 may have its own communication session with the relay service 730.

The relay service 730 may be configured to provide interpretive services (e.g., captioning) to the hearing-impaired user 702. More specifically, a human "call assistant" within relay service 730 may be employed to facilitate an assisted call between a hearing-impaired user 702 and a far-end user 704. As discussed above, in some embodiments the relay service 730 may be configured to provide text captions of at least a portion of the conversation. In such an embodiment, the call assistant may listen to the voice signal received and re-voice the portion of the conversation into a microphone so that voice recognition software may generate the text captions that are transmitted to the first communication device 710. Thus, the relay service 730 may include one or more of an internet protocol captioned telephone service (IPCTS), captioned telephone service (CTS), or other telecommunications relay services (TRS).

FIG. 7 shows a configuration where the first communication device 710 acts as a router for the voice signal from the second communication device 720 to the relay service. In such an embodiment, the voice signal of the far-end user 704 may be transmitted from the second communication device 720 to the first communication device 710. The voice signal of the far-end user 704 may then be transmitted from the first communication device 710 to the relay service 730 for the text captions to be generated in a text captioning embodiment. The text captions may then be transmitted from the relay service 730 to the first communication device 710 to be displayed as text captions for the hearing-impaired user to read during the conversation. The call assistant may also monitor the text captions that are generated and transmitted to the first communication device 710 to identify any errors that may have been generated by the voice recognition software. In some embodiments the relay service 730 may be configured to receive the voice signal from the second communication device 720 and route the voice signal to the first communication device 710. In some embodiments, another device may receive the voice signal from the second communication device 720 and split the voice signal to route to both the first communication device 710 and the relay service 730.

In addition, although FIG. 7 shows only two communication devices 710, 720, the communication system 700 may include more communication devices. It is contemplated that the communication system 700 may facilitate communication between any number and combinations of hearing-impaired users and far-end users. For example, in some embodiments two or more communication devices may be connected for facilitating communication between a hearing-impaired user and other hearing-impaired users and/or far-end users. Embodiments of the disclosure improve upon the communication system by providing an improved method for echo cancellation within the first communication device 710 as described above.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventor.

What is claimed is:

1. A communication device configured for echo cancellation, comprising:
   a microphone configured to capture a near-end signal;
   a speaker configured to produce sound from a far-end signal; and
   a processor operably coupled with the microphone and the speaker, the processor configured to:
      operate a background filter configured as an adaptive filter having background filter coefficients;
      operate a foreground filter configured as a fixed filter having foreground filter coefficients;
      update the foreground filter coefficients with coefficients from the background filter responsive to monitoring a recent history of both a near-end signal energy and an estimated far-end signal energy for a predetermined time window in which conditions of each of the near-end signal energy and the estimated far-end signal energy are determined to be satisfied over the predetermined time window having a fixed length (L) that is a last L number of samples taken at any given time for the near-end signal energy and the estimated far-end signal energy; and
      generating an echo cancelled signal using the foreground filter.

2. The communication device of claim 1, wherein the processor is configured to:
   count a first number of times that the near-end signal energy is above a first pre-determined energy threshold during the predetermined time window and comparing the first number against a first count threshold to determine whether a first condition is satisfied; and
   count a second number of times that the estimated far-end signal is below a second pre-determined energy threshold during the predetermined time window and comparing the second number against a second count threshold to determine whether a second condition is satisfied.

3. The communication device of claim 2, wherein the first count threshold is defined as a first fraction of the predetermined time window, and the second count threshold is defined as a second fraction of the predetermined time window.

4. The communication device of claim 3, wherein the first fraction ($F_x$) is between an interval of $0.7 \leq F_x \leq 1$ when a first count value and the first count threshold are based on a number of samples being counted above the first pre-determined energy threshold.

5. The communication device of claim 3, wherein the second fraction ($F_a$) is between an interval of $0 \leq F_a \leq 0.05$ when a second count value and the second count threshold are based on a number of samples being counted below the second pre-determined energy threshold.

6. The communication device of claim 1, wherein the background filter is a recursive least squared (RLS) adaptive filter.

7. The communication device of claim 6, wherein the RLS adaptive filter implements an algorithm selected from a group consisting of a covariance-matrix-based RLS algorithm and its square root versions that use a tapped-delay line parameterization and the matrix inversion lemma, an order-recursive RLS algorithm that uses a lattice structure for the filter parameterization and error computation, and a fast fixed-order RLS algorithm.

8. The communication device of claim 1, wherein the processor is configured to operate a state machine to control the RLS adaptive filter and update the foreground filter with coefficients from the background filter.

9. The communication device of claim 8, wherein the state machine controls an amplitude control block of the near-end signal after transferring the coefficients has been initiated.

10. The communication device of claim 1, wherein the communication device is a caption-enabled device specifically configured for use by a hearing-impaired user to receive and display text captions from a communication service during a communication session with a far-end communication device.

11. A method for cancelling echo in a communication device during a communication session with a far-end device, the method comprising:
   monitoring a near-end signal energy of a near-end signal;
   monitoring an estimated far-end signal energy of a far-end signal;
   performing an echo cancellation on an input signal that is input to an echo canceller;
   determining if the near-end signal energy satisfies a first condition over recent history having a predetermined time window having a fixed length (L) that is a last L number of samples taken at any given time for the near-end signal energy and the estimated far-end signal energy;
   determining if the far-end signal energy satisfies a second condition over the predetermined time window;
   transferring coefficients from an adaptive background filter to a fixed foreground filter responsive to satisfying the first and second conditions for the pre-determined time window; and generating an echo cancelled signal using the foreground filter.

12. The method of claim 11, wherein monitoring the near-end signal energy includes generating a first count value for a number of samples of the near-end signal energy on one side of a first energy threshold during the predetermined time window.

13. The method of claim 12, wherein monitoring the estimated far-end signal energy includes generating a second count value for a number of samples of the estimated far-end signal energy on one side of a second energy threshold during the pre-determined time window.

14. The method of claim 13, further comprising determining whether the first and second conditions for the near-end signal energy and the estimated far-end signal energy are satisfied by:
comparing the first count value to a first count threshold value to determine if the first condition is satisfied; and
comparing the second count value to a second count threshold value to determine if the second condition is satisfied.

15. The method of claim 14, wherein the first count threshold value is a first fraction of the number of samples in the pre-determined time window, and the second count threshold value is a second fraction of the number of samples in the pre-determined time window.

16. The method of claim 14, wherein the first count value is for the number of samples of the near-end energy that is above the first energy threshold during the pre-determined time window, and the first condition is met if the first count value is greater than the first count threshold.

17. The method of claim 14, wherein the first count value is for the number of samples of the near-end energy that is below the first energy threshold during the pre-determined time window, and the first condition is met if the first count value is less than the first count threshold.

18. The method of claim 14, wherein the second count value is for the number of samples of the estimated far-end energy that is below the second energy threshold during the pre-determined time window, and the second condition is met if the second count value is less than the second count threshold.

19. The method of claim 14, wherein the second count value is for the number of samples of the estimated far-end energy that is above the second energy threshold during the pre-determined time window, and the second condition is met if the second count value is greater than the second count threshold.

20. The method of claim 11, wherein monitoring the near-end signal energy of the near-end signal and the far-end signal energy of the far-end signal each comprise storing sample values in a circular buffer configured to replace an oldest sampled value with a newest sampled value such that a number of sampled values stored in the circular buffer at a time corresponds to the predetermined time window.

21. A non-transitory computer-readable medium that, when executed by a processor, is configured to operate an echo cancellation module, comprising:
an adaptive background filter configured to generate an adaptive echo canceled output from a line-in signal and a line-out signal; and
a fixed foreground filter configured to generate an echo canceled signal from the line-in signal and the line-out signal, wherein coefficients for the fixed foreground filter are updated with coefficients from the adaptive background filter responsive to satisfying conditions indicating that a near-end signal is generally active and a far-end signal is generally inactive over a recent history of both a near-end signal energy and an estimated far-end signal energy during a pre-determined time window having a fixed length (L) that is a last L number of samples taken at any given time for the near-end signal energy and the estimated far-end signal energy.

* * * * *